United States Patent [19]
Nester et al.

[11] Patent Number: 5,904,864
[45] Date of Patent: May 18, 1999

[54] ROBOTIC WELDING

[75] Inventors: Paul Douglas Nester, Overland Park, Kans.; Jeffrey G. Reynolds, Milford, Del.

[73] Assignee: Baltimore Aircoil Company, Inc., Jessup, Md.

[21] Appl. No.: 08/978,723

[22] Filed: Nov. 26, 1997

[51] Int. Cl.⁶ .................................................... B23K 9/12
[52] U.S. Cl. .................................... 219/60.2; 219/124.34; 901/42
[58] Field of Search ............................. 219/60.2, 124.34, 219/125.11, 125.1; 901/42

[56] References Cited

U.S. PATENT DOCUMENTS

| | | | |
|---|---|---|---|
| 4,425,491 | 1/1984 | Batistoni et al. | 219/60.2 |
| 4,965,431 | 10/1990 | Monteleone | 219/60.2 |
| 5,370,296 | 12/1994 | Brinck et al. | 219/60.2 |

OTHER PUBLICATIONS

Paper entitled "Description of Prior Welding" with drawing.

*Primary Examiner*—Clifford C. Shaw
*Attorney, Agent, or Firm*—Edward J. Brosius; F. S. Gregorczyk; Stephen J. Manich

[57] ABSTRACT

A robotic welding method for making a heat exchanger having tubes and inlet and outlet headers is disclosed. The headers have planar tubesheets and covers. The planar tubesheets are welded to the inlet and outlet ends of tubes. The tubesheets have two co-linear edge portions and a third edge intersecting a line through the two co-linear edge portions. The tubesheet has interior edges defining holes through which the ends of tubes extend. A robotic welding system is provided, with a sensor, a welding apparatus and a controller for controlling the movement and operation of the welding apparatus. The tubesheet is scanned to find the first and second co-linear edge portions, the third intersecting edge portion, and the face of the tubesheet. An actual origin is defined at the intersection of a first line through the first two co-linear edge portions found through scanning and a second line perpendicular to the line through the co-linear edge portions and extending through the third intersecting edge portion found through scanning and lying on the plane of the tubesheet face. The welding apparatus is moved to weld the tubesheet and tubes together. The positions of the welds are based upon the location of the actual origin of the tubesheet relative to the robotic system. After the tubesheet has been welded to the tube ends, the cover is welded to the tubesheet. The robotic welding system uses the same coordinate system that it has defined and performs additional scans of the cover to determine two points on each of the side faces of the cover and one point and each of the cover's end faces. The welding apparatus then welds the cover to the tubesheet along the edges of the cover faces.

8 Claims, 4 Drawing Sheets

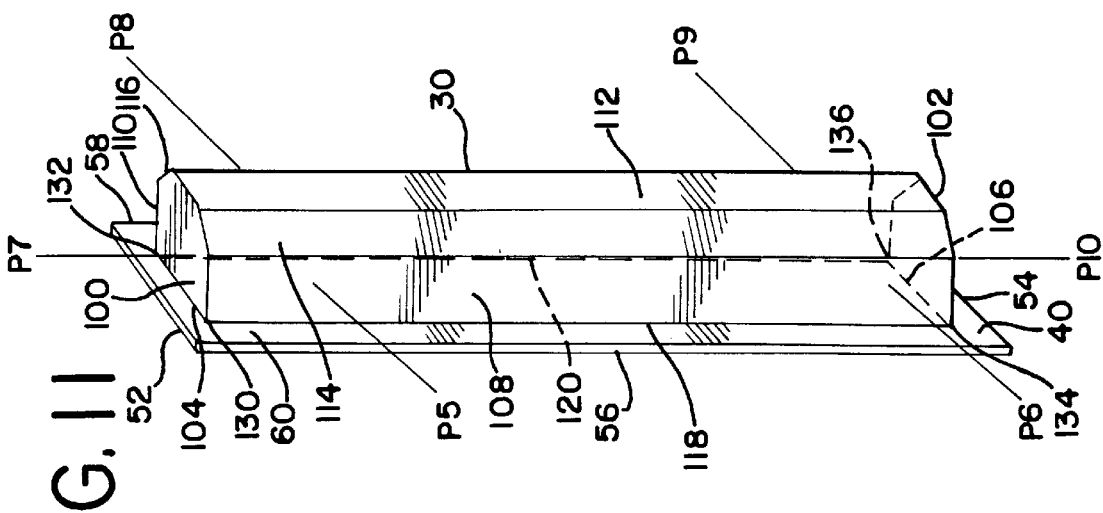
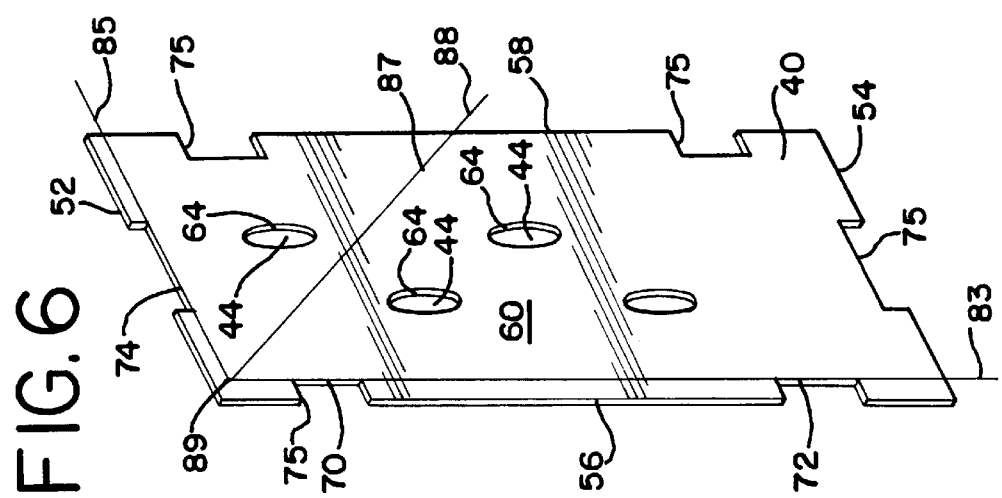
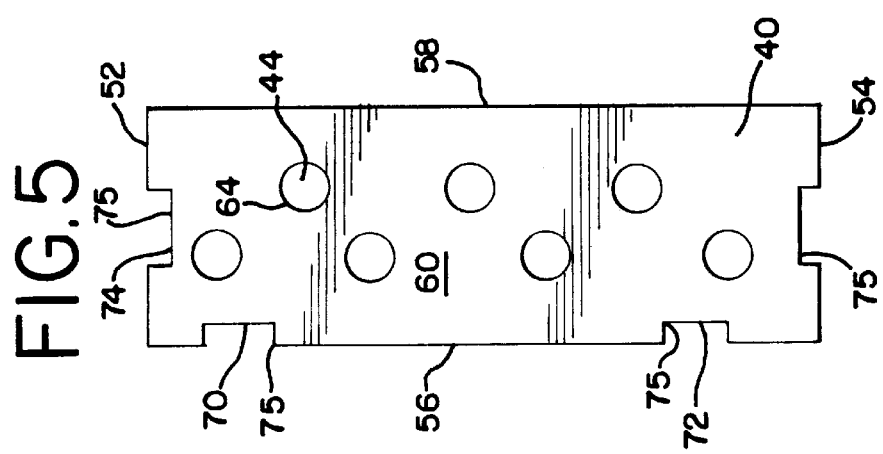

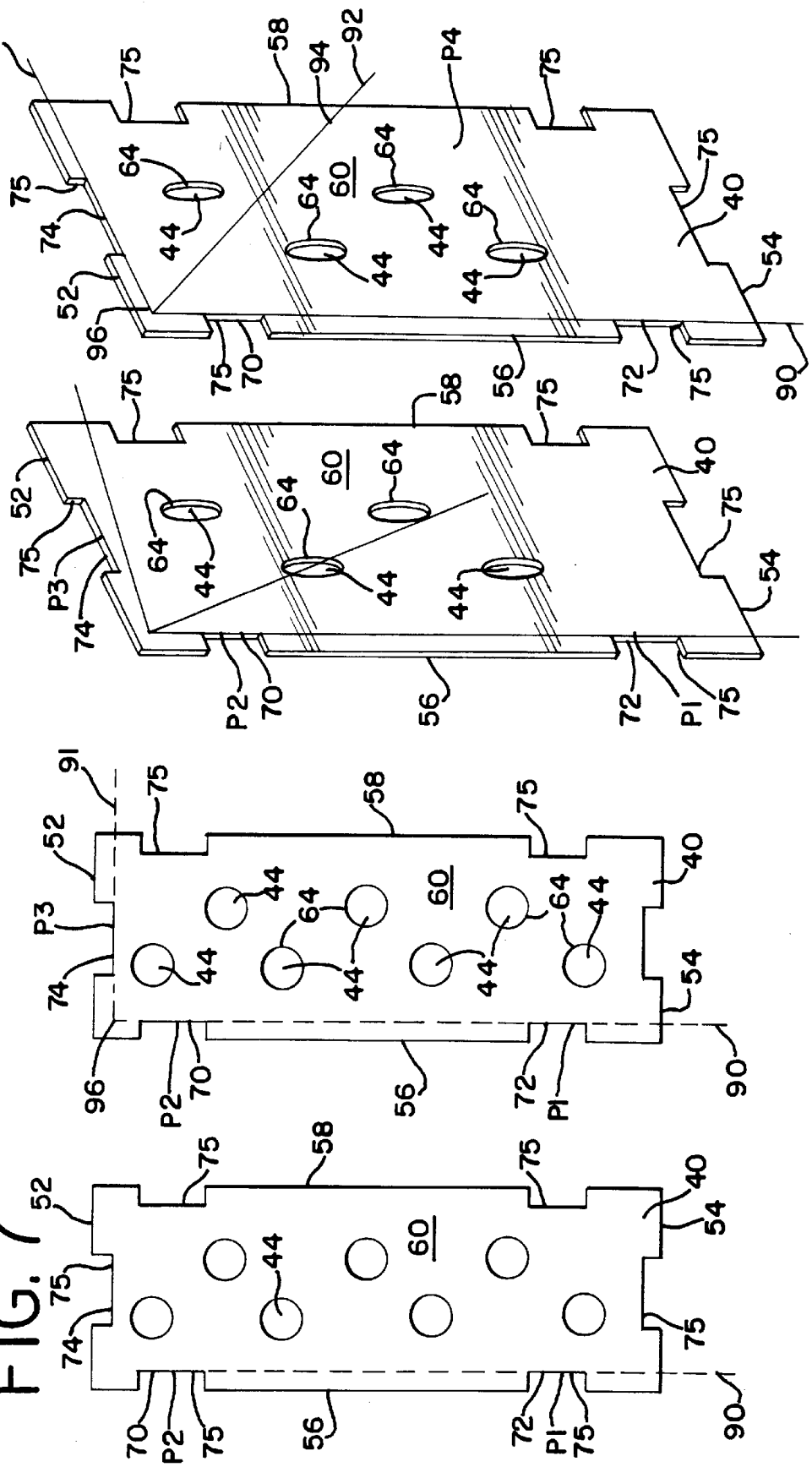

5,904,864

ROBOTIC WELDING

FIELD OF THE INVENTION

The present invention relates to robotic welding, and more particularly, to robotic welding of a header on the co-planar ends of a group of tubes for fluid-tight seals.

BACKGROUND OF THE INVENTION

Heat exchangers and other devices typically include a stack of bent tubes connected at their ends to flat tubesheets that are welded to another sheet metal product to form a fluid header. The tube ends and flat tubesheets must usually be welded, and the welds must not only provide a joint with sufficient structural strength to join the pieces, but must also provide a water or fluid-tight seal so that the fluid may transfer between the header and the individual tubes without leaking.

In a typical coil for a heat exchanger, there may be more than fifty tubes to be welded to the tubesheet. Considering that there are typically two similar headers for each coil, there may be well over one-hundred welds to be performed. Manual welding of so many joints is time consuming and therefore potentially expensive. However, implementation of robotic welding has been difficult. Given the need for fluid tight seals, it is necessary that each weld completely surround each junction of a tube end and the tubesheet. Given the size of the coils, manipulation of the coil for accurate welding has been problematic, and it is difficult and expensive to attempt to make a fixture that would hold such bulky workpieces repeatedly and consistently in the same position with respect to a welding machine so that such fluid-tight welds could be produced.

Attempts to achieve consistent, reproducible welds in mass production through use of commercially available robotic systems have also met with problems. It has remained difficult to achieve acceptable fluid-tight welds in successive combinations of tubes and tubesheets.

SUMMARY OF THE INVENTION

The present invention addresses the need for efficient and accurate welding of a bulky object, such as a coil with headers for use in a heat exchanger. One object of the present invention is to provide for accurate robotic welding of two workpieces without requiring a fixture that would define the robot's coordinate system.

The present invention provides a method of making a heat exchanger having tubes with inlet and outlet headers welded to the tubes. The method comprises the steps of providing a planar tubesheet to form part of the inlet header, and providing a planar tubesheet to form part of the outlet header. Each tubesheet has a perimeter. Each tubesheet also has a first edge portion, a second edge portion and a third edge portion along the perimeter of the tubesheet. The first and second edge portions are substantially co-linear, and the third edge portion intersects a line through the first and second edges. Each tubesheet has a substantially planar surface with interior edges defining interior holes to receive the ends of the tubes. A robotic welding system is provided including a sensor, a welding apparatus and means for controlling the movement and operation of the welding apparatus. The control means accepts input from the sensor. A reference origin is defined along a line through the first and second edge portions of the tubesheet and a line through the third edge portion and perpendicular to the line through the first and second co-linear edge portions. A reference three-dimensional coordinate system is provided having the reference origin. The reference three-dimensional coordinate system includes reference weld locations for the tubesheet based on distances from the reference origin, so that movement of the welding apparatus may be based upon the reference weld locations and reference three-dimensional coordinate system. One of the tubesheets is scanned with the robotic system sensor a sufficient number of times to define an actual origin lying along a line through the first and second edge portions and a line through the third edge portion and perpendicular to the line through the first and second co-linear edges. The robotic system correlates the actual origin and the reference origin. The welding apparatus of the robotic system is moved to weld the tubesheet and the tubes together. The positions of the welds are based upon the location of the actual origin.

BRIEF DESCRIPTION OF THE DRAWINGS

FIG. 5 is an elevation of a tubesheet of the present invention.

FIG. 6 is a perspective view of an alternative tubesheet of in the present invention, showing a reference coordinate system in place on the tubesheet.

FIG. 7 is an elevation of a tubesheet showing the locations of the first two search points located through the method of the present invention, and showing the preliminary position of one of the axes determined by the robotic system.

FIG. 8 is an elevation of the tubesheet of FIG. 7 showing the location of the third search point located through the method of the present invention and showing the shift of the origin and axes to account for the third search point.

FIG. 9 is a perspective view of the tubesheet of FIGS. 7–8, showing that the coordinate system and origin based on the locations of the first three search points can be askew on the tubesheet surface.

FIG. 10 is a perspective view of the tubesheet of FIGS. 7–9, showing a possible location of the fourth search point and the proper alignment of the actual coordinate system based upon the first four search points.

FIG. 11 is a perspective view of the tubesheet of FIGS. 7–10, showing a cover positioned on the tubesheet and the positions of the search points for welding the cover onto the tubesheet.

DETAILED DESCRIPTION

Figure 1:
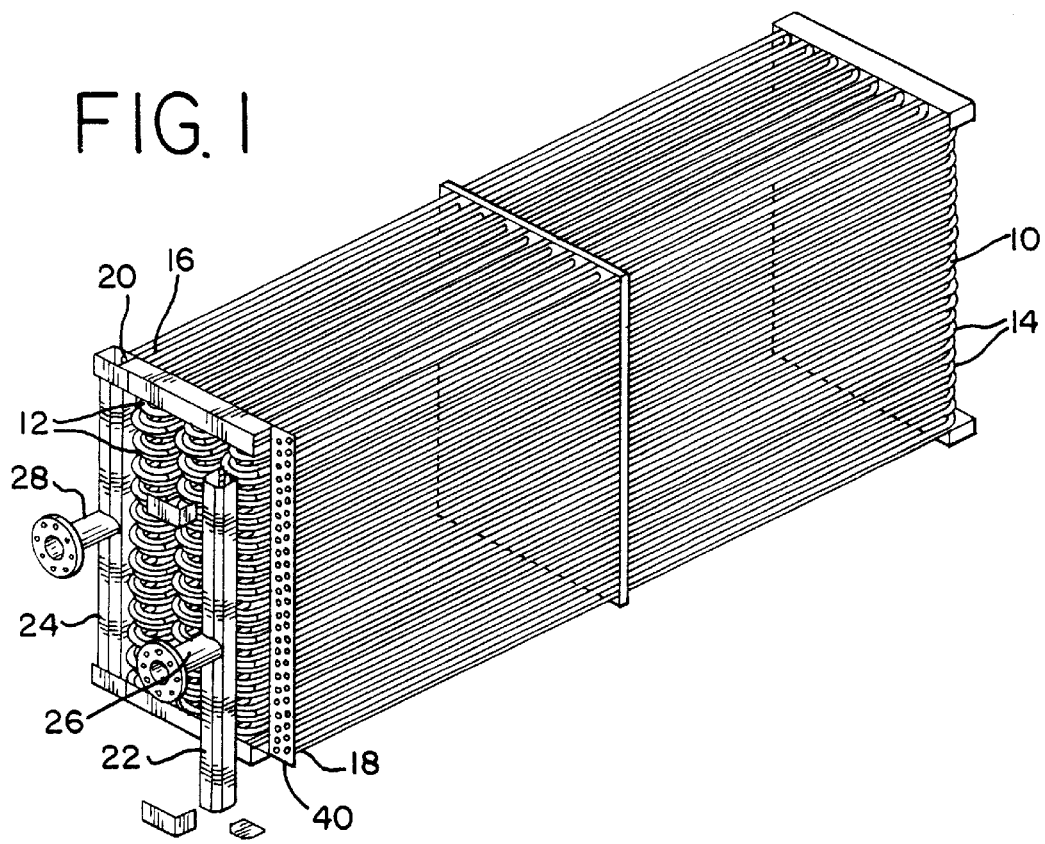
FIG. 1 is a perspective view of a coil of tubes with inlet and outlet headers at one end, with one of the headers shown in exploded view.

As shown in FIG. 1, a coil or tube bundle 10 for use in a heat exchanger typically includes a plurality of horizontal rows 12 of tubes 14 bent into a serpentine pattern. The rows of tubes are assembled as a bundle or group of overlying rows. The vertical planes of overlying rows 12 may be slightly offset horizontally as shown. Typical tube arrangements may carry cooling water, oil, ethylene glycol solutions, and other fluids or refrigerants in a closed, pressurized system. Design pressure in such systems may be on the order of 280 psig, and test pressures may be on the order of 350 psig. In some environments, it may be necessary or desirable for the coil or tube bundle 10 to meet the ASME Boiler and Pressure Vessel Code.

In the illustrated embodiment, the tubes are continuous steel tubing, formed into the serpentine shape and welded into the assembly. The complete assembly may be hot-dip galvanized after fabrication.

At one end 16 of the illustrated tube bundle 10, each horizontal row 12 of continuous tube 14 has an inlet end 18 and an outlet end 20. As illustrated, the inlet and outlet ends of overlying rows of tubes are slightly offset in a horizontal direction, so that the inlet ends of adjacent rows are in different vertical planes, and so that the inlet ends of alternating rows are vertically aligned, as are the outlet ends of alternating rows. The inlet ends 18 are all connected to an inlet header 22 and the outlet ends 20 are all connected to an outlet header 24.

The illustrated inlet header 22 is connected to an inlet pipe 26 and the outlet header 24 is connected to an outlet pipe 28. The inlet pipe 26 may, for example, be connected to receive an industrial process fluid to be cooled, and the outlet pipe 28 may be connected to deliver a cooled industrial process fluid back to the industrial process equipment. Similarly, the inlet pipe 26 could be connected to receive a vapor to be condensed, and the outlet pipe 28 may deliver the condensed liquid back into the industrial process line.

Figure 2:
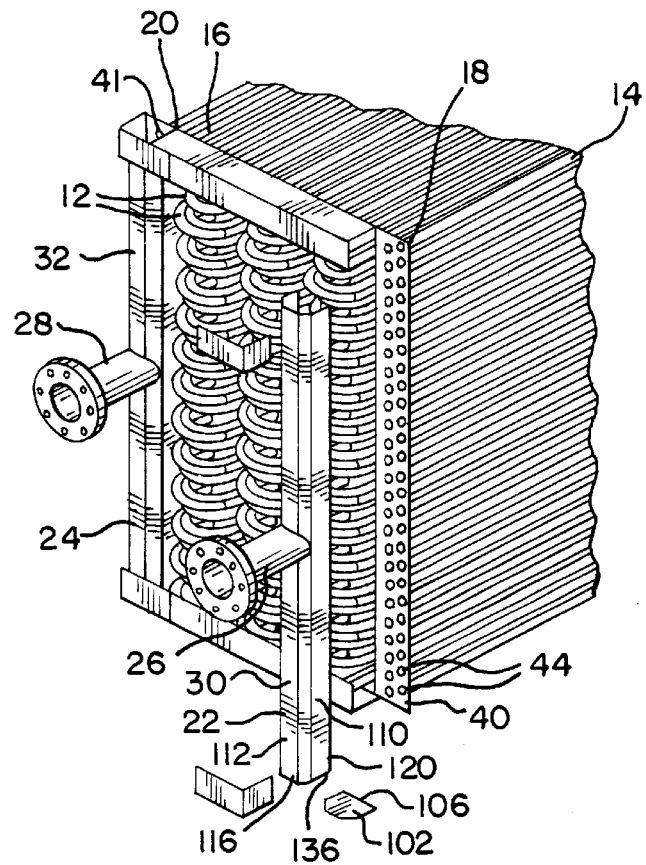
FIG. 2 is an enlarged view of the header end of the coil of FIG. 1.

Each header 22, 24 comprises an inlet and outlet cover 30, 32 and an inlet and outlet tubesheet. FIGS. 1 and 2 illustrate the inlet tubesheet 40; the outlet tubesheet 41 is substantially the same as the inlet tubesheet, and the following description of the inlet tubesheet 40 applies as well to the outlet tubesheet 41. As shown in the exploded view of FIG. 2, the inlet tubesheet 40 has a flat surface and has a plurality of circular holes or openings 44. In the illustrated embodiment, there are two groups of openings or holes 44, so that alternating openings are aligned parallel with an edge of the tubesheet and adjacent openings are not aligned parallel to an edge of the tubesheet. Each opening or hole 44 of the inlet tubesheet 40 is connected to an inlet end 18 of one tube 14. The outlet tubesheet 41 has similar openings 44 connected to the outlet ends 20 of the tubes 14.

The ends 18, 20 of the tubes 14 at the junctures with the tubesheets 40, 41 at the openings 44 are connected to the tubesheets by welding. For use in the described environments, that is, in vapor condensing and fluid cooling, the welds must not only connect the parts into the complete assembly, but must also be fluid tight to prevent leaks. Creating such welds in such an environment as that illustrated in FIGS. 1–2, where there are over one-hundred junctions of tube ends and tubesheets 40, is labor intensive if done manually. It has been difficult to achieve acceptable welding with traditional robotic welding since the tube bundle is so large and bulky, often measuring from three to eighteen feet in length, from three to five feet wide, and from three to five feet high, and weighing on the order of 1500–3000 pounds, although it should be understood that these values are given for purposes of illustration only. The tubesheets may be about five inches wide and from about thirty-three to sixty-six inches long and about one-quarter inch thick, for example, and again these values are given for purposes of illustration only. With parts of such proportions, it is difficult to achieve consistent positioning of the parts relative to the robotic welding apparatus. Such bulky parts are not easily carried or supported by a positioning fixture that would assure consistent proper orientation of the tubes and tubesheets for the start of welding. Without exact, consistent and repeatable positioning of the part and the welding unit, there is a chance for there to be slight variations in relative position that translate into potential improper positioning of the welded junctions, with the potential for leaky joints, an unacceptable result.

The present invention provides a method of robotic welding such junctions that assures exact, consistent and repeatable results. The present invention achieves these results by assuring that the robotic welding commences at an origin point that is determined for each tubesheet individually before welding commences. In addition, the process ensures that the robotic welding frame of reference, that is, the reference three-dimensional Cartesian coordinate system, overlies and is coincident with the actual three-dimensional spatial orientation of the tubesheet. The present invention also utilizes this data in welding the covers on the tubesheets to complete the headers. The present invention may be used to manufacture serpentine tube bundles of the type illustrated in FIGS. 1–2, as well as other styles of tube bundles and headers, such as a tube bundle with straight-through tubes and headers on both ends of the tubes; moreover, the principles of the present invention may be applied to other welding operations involving heavy, bulky or cumbersome articles.

The present invention achieves accurate welding of two workpieces together through the following steps. First, workpieces to be welded are provided. These workpieces may be, for example, a planar end or tubesheet 40 to form part of a header and the second workpiece may be an arrangement of tubes 14 such as a coil bundle 10 comprised of a plurality of tubes with ends, such as inlet ends 18 and outlet ends 20, to be placed through mating holes in the inlet tubesheet 40 and outlet tubesheet 41 and have their surfaces welded to the edges of the holes.

Alternate tubesheets for use with the present invention are illustrated in FIGS. 5–6. It should be understood that the following description applies to both the outlet tubesheets 41 and inlet tubesheets 40, although the tubesheet is identified with reference numeral 40 in each of FIGS. 4–11. Each illustrated tubesheet 40 has a top edge 52, a bottom edge 54, a first side edge 56 and a second side edge 58. Each tubesheet 40 is substantially rectangular, with the side edges 56, 58 being longer than the top 52 and bottom 54 edges. The top and bottom edges 52, 54 are roughly parallel to each other and roughly perpendicular to the two side edges 56, 58. Each tubesheet 40 has a substantially planar face 60 between the edges 52, 54, 56, 58 and a plurality of interior edges 64 defining the circular holes 44. Each circular hole 44 receives the end of one coil tube 14, such as the inlet end 18 or outlet end 20, and the tubesheets 40, 41 are to be welded to the inlet and outlet ends 18, 20 of the coil tubes 14 along the edges 64 of each circular hole 44. It should be understood that the size and shape of the illustrated tubesheet 40 are given for purposes of illustration only; a tubesheet may have many more or fewer holes arranged differently, and the tubesheet may be shaped differently.

As shown in FIG. 5, each illustrated tubesheet 40 has at least two substantially co-linear segments or edge portions 70, 72 and at least one additional third segment or edge portion 74 perpendicular to a line through the first and second segments or edge portions 70, 72. All of the segments or edge portions 70, 72, 74 are along the perimeter, that is, along the exterior edges 52, 54, 56, 58 of the tubesheet 40. Each segment or edge portion 70, 72, 74 corresponds with a cutout or notch 75 in one of the exterior edges 52, 54, 56, 58 of the tubesheet 40, formed by precision cutting out a section of the respective exterior edge of the tubesheet. The precision cutting may be through stamping, laser cutting or the like. In the embodiment of FIG. 5, there are two cutouts 75 in or along one exterior edge 56 and each has at least one point, shown at "P1" and "P2" in FIGS. 7–9, that is co-linear with the other, although in the illustrated cutouts 75 the co-linear points P1 and P2 comprise short line segments; the third cutout has a perpendicular point, shown at "P3" in FIGS. 8–9, that is, a point that lies along a line that is substantially perpendicular to a line through the first and second co-linear points P1 and P2.

In the tubesheet of FIG. 6, both long exterior edges 56, 58 have the first and second co-linear segments or edge portions 70, 72 and co-linear points, and both short top and bottom exterior edges 52, 54 have the third segments or edge portions 74 that are perpendicular to the co-linear segments or edge portions 70, 72. As discussed below, this construction provides greater flexibility in using the tubesheets.

The cutouts or notches 75 are each precision cut to provide a group of reference segments or edge portions within a close tolerance for accuracy. The precision cutting may be through, for example, stamping, shearing or laser cutting operations, for example. Rather than go through the expense of machining, shearing or stamping the entire length of each edge of the tubesheet, expense may be saved by assuring that the shorter cutouts or notches 75 are precisely located. The distances between the cutouts and their orientation relative to one another should be within close tolerances: the cutouts along the elongate exterior side edges 56, 58 should be assured of being co-linear so that each pair may be used to establish one axis of the three dimensional Cartesian coordinate system; the co-linear cutouts on the side edges 56, 58 should be assured of being perpendicular to the cutouts on the top and bottom edges 52, 54; the positions of the cutouts are preferably accurate to within thousandths of an inch.

In addition, the cutouts or notches 75 may be precision cut at the same time as the interior holes 44 are cut in the tubesheet 40, with the same equipment or with equipment positioned by the notches or the holes so that the spatial relationship between each hole and the notches is known and can be used in programming the robotic welder. With the tubesheet 40 notches 75 and holes 44 so made, the relative positions of the notches and holes may be precisely and consistently located. Thus, a reference origin and coordinate system can be programmed and instructions for movement and welding can be based on the relative positions of the notches 75 and the holes 44. As long as the reference coordinate system for the tubesheet and welds corresponds with the actual orientation of the tubesheet face 60, the welds between the tubesheet and the coil tubes should be accurately placed and should produce a leak-proof weld.

Figure 4:
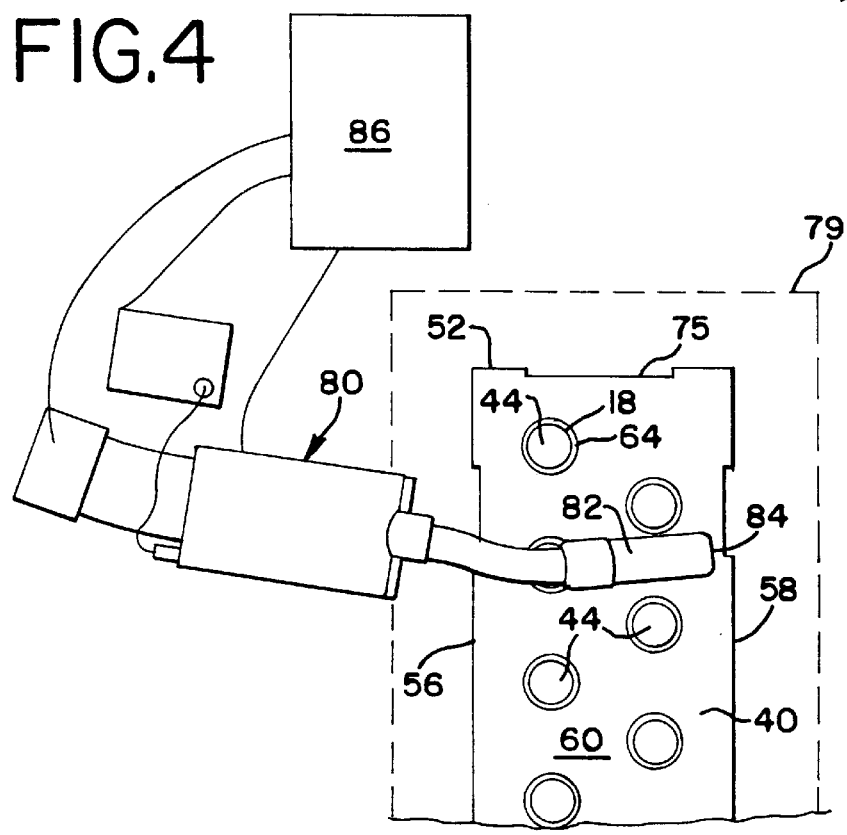
FIG. 4 is a schematic elevation of part of a robotic welding apparatus and tubesheet.

A robotic welding system 80 is used in the present invention. The robotic welding system 80, shown schematically in FIG. 4, includes a sensor 82, a welding apparatus 84 and means 86 for controlling the movement and operation of the welding apparatus 84 and the sensor 82. The controlling means 82 accepts input from the sensor, and preferably comprises a programmable element and compatible software, such as a computer, which can be programmed with a reference coordinate system and weld sites. One such robotic welding system that is commercially available is sold by ABB, Inc. (Asea Brown Boveri)—Flexible Automation, Welding Systems Division, of Ft. Collins, Colo. A suitable robotic welder is an IRB 2400 6-axis industrial robot M94A. This commercially available robotic welding system includes a sensor and a welding apparatus. The sensor in this apparatus is part of the welding torch, as illustrated in FIG. 4, so that the same manipulator arm is used for both sensing and welding the workpieces. Two commercially available software programs that may be used as part of the controlling means are "Arcware" welding software from ABB and "Smartac" tactile sensing software available from ABB to interface with the "Arcware" software. This equipment and software are capable of storing a theoretical or reference Cartesian coordinate system and reference weld locations. It should be understood that the present invention is not limited to this robotic system or software, and that this system and software are identified for purposes of illustration only.

The method of the present invention may include the step of providing a reference three-dimensional coordinate system 88 with a reference origin 89, shown in FIG. 6. The robotic welding system software would also include reference weld locations for the tubesheet based on distances from the reference origin 89 in the reference coordinate system 88. The reference weld locations would comprise precise, predetermined distances from the reference origin 89 along reference X, Y and Z axes, designated 83, 85, 87 respectively in FIG. 6, to which the robotic welding apparatus must be moved, locations of its paths of travel, and locations where the welding apparatus should be operating to make a weld and locations where it should be turned off to travel from joint to joint, to complete all of the desired welds. The reference coordinate system and reference weld locations are predetermined and input and stored into the memory of the robotic system, such as in the controlling means 86. While the above-described equipment and software available from ABB can determine an initial X-Y-Z coordinate system, the initial coordinate system may not coincide with the plane of the face of the tubesheet, and the initial origin may be offset from the desired position for the origin. The present invention provides a search routine that precisely and consistently locates the origin of the tubesheet relative to the notches to assure accurate welding of the holes which are in a fixed precise and consistent relationship with the notches.

Figure 3:
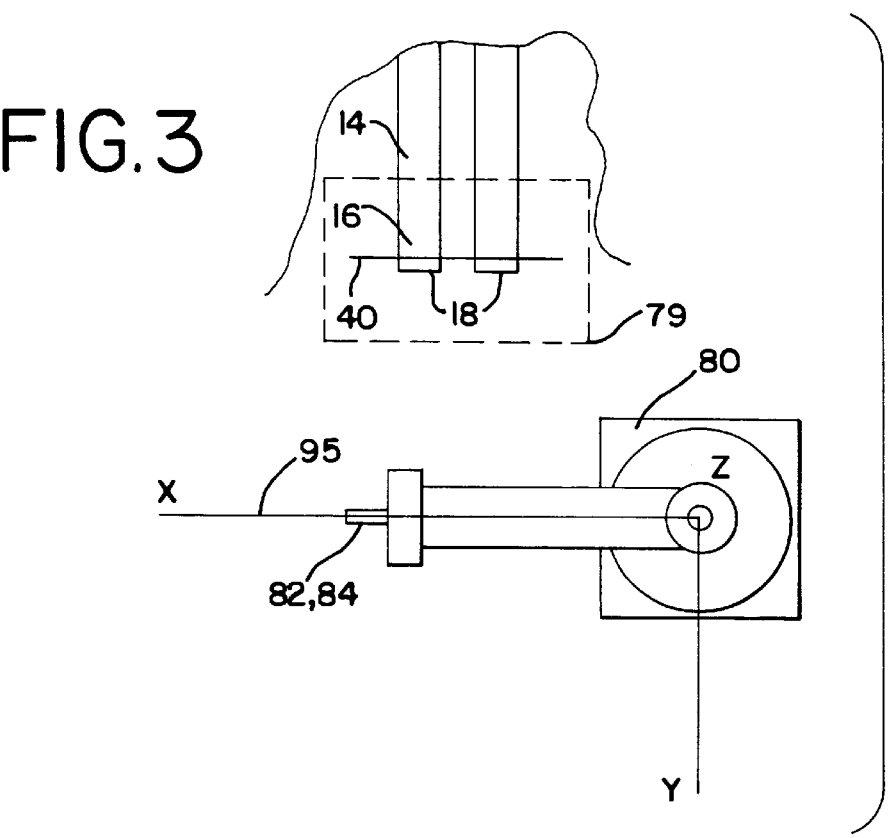
FIG. 3 is a partial top plan view of a welding area, showing part of a tubesheet and part of a coil in relation to a robotic welding apparatus, the tubesheet and part of the coil being enlarged with respect to the robotic welding apparatus, the elements being shown schematically.

Before commencing scanning and welding, the tubesheet 40 and bundle 10 of tubes 14 are positioned in a juxtaposed relationship for welding, with the inlet ends 18 of the tubes 14 extending slightly through the interior holes 44 in the tubesheet 40. The planar face 60 of the tubesheet 40 is disposed in a substantially vertical plane. The bundle 10 of tubes 14 and tubesheet 40 are supported in this relationship free from any fixture for serially receiving and positioning the workpieces in an identical pre-determined position relative to the robotic welding system 80. The outlet tubesheet 41 may also be positioned at this time, with the outlet ends 20 of the tubes 14 extending slightly through the interior holes 44 of the outlet tubesheet 41; the outlet tubesheet may alternatively be positioned for scanning and welding at a later time. The combination of tubesheet 40 and bundle 10 of tubes 14 are positioned and supported so that the tubesheet is within a search volume or box 79, shown in phantom in FIGS. 3–4.

In the method of the present invention, the robotic welding system 80 first begins searching from the edge of the search volume or box 79 in several directions looking for the tubesheet. Once the tubesheet is located, the robotic welding system searches the bottom portion of the side edge 56 of the tubesheet 40 to find the inside edge or bottom co-linear segment 72 of the bottom co-linear cutout or notch, and then searches the bottom portion of the outside face 60 of the tubesheet 40 to determine a first point P1 that is along the bottom co-linear segment 72 of the cutout and at the surface of the outside face 60 of the tubesheet, as shown in FIG. 7. The first point P1 is then stored in the memory of the robotic controlling means 86. Next, the robotic welding system 80 moves its sensor 82 to scan the top portion of the same side edge 56, searching for the top cutout or notch 75, and locates the inside edge or top co-linear segment 70 of the top cut-out; the robotic welding system moves its sensor to scan the planar face 60 of the tubesheet 40 to determine a second point P2 at the face of the tubesheet and on the top co-linear segment 70, as shown in FIGS. 7–8. The second point P2 is stored in the memory of the robotic controlling means 86.

As shown in FIG. 7, the location of these two points P1 and P2 allows one actual axis of the face 60 of the tubesheet 40, the X-axis for example, to be determined. In FIGS. 7–8, the actual X-axis is designated by reference number 90. The method of the present invention continues to determine a third point so that the actual origin can be found for the tubesheet.

As shown in FIG. 8, the robotic system sensor 82 is moved to search the top edge 52 of the tubesheet 40 to find the inside edge or third segment 74 of the top cut-out or notch 75. This third point P3 is stored in the memory of the robotic controlling means 86. With this position located, the X-Y-Z coordinate system may be translated so that the Y-Z plane intersects both the inside edge of the top cutout, that is, the third segment 74 at P3 and the previously-defined X-axis 90, and is perpendicular to the previously-defined X-axis 90. As shown in FIG. 8, the Y-axis 91, which lies in the Y-Z plane, will lie in the same plane as point P3.

Even with the X axis 90 and Y-Z plane accurately located, the actual coordinate system may still not be flush with the plane of the face 60 of the tubesheet 40, as shown in FIG. 9. Accordingly, the robotic welding system 80 next determines the actual three-dimension orientation of the planar face 60 of the tubesheet 40 relative to the robotic system coordinate system by again scanning the tubesheet 40 face 60. As with points P1 and P2, it may be desirable to search the face 60 of the tubesheet 40 near the third segment 74 before defining the point P3 to assure that the third point is not offset from the plane of the tubesheet face 60. With point P3 lying on the face 60 of the tubesheet, the Y-axis 91 should be co-planar with the face 60 of the tubesheet 40, and the actual origin 96 may be defined as the intersection of the X and Y axes 90, 91. Alternatively, the robotic welding system may move the sensor 82 to locate another point on the face 60 of the tubesheet 40 spaced from the X and Y axes 90, 91, and may store this point in memory as P4, as shown in FIG. 10. With this point P4 determined, the robotic controlling means software can determine the complete spatial orientation of the tubesheet, and can determine the actual position of the actual Z-axis 92 for the tubesheet, and can determine the position of the actual origin 96 based on the orientation of the actual X, Y and Z axes 90, 91, 92. The software can correlate the theoretical or reference coordinate system 88 and the actual coordinate system 94, along with the coordinate system for the robotic welding system itself, designated at 95 in FIG. 3; that is, the software can rotate the reference coordinate system 88 to coincide with the actual coordinate system 94 for the tubesheet, and determine its position relative to the actual coordinate system. The present invention provides for this determination to be made independent of the position and orientation of any fixture supporting the tubesheet and coil, and independent of any assumed position for these pieces. Instead, the determination is made based on the position of the tubesheet 40 itself by scanning the surface of the tubesheet.

Although the actual origin 96 could be found using either a P3 that is on the face 60 of the tubesheet 40, it may be desirable to use P4 as described to account for any bending that may occur in the top edge of the tubesheet.

Once the precise actual spatial orientation of the tubesheet 40 is known, and the reference coordinate system 88 is aligned or made to coincide with the actual spatial orientation of the tubesheet 40, the welding operation can commence with the assurance that the weld points will be located as predetermined and programmed. That is, the positions of the welds will be based upon the location of the actual origin 96 and actual orientation of the planar face 60 of the tubesheet relative to the robotic welding system. The robotic welding system 80 may then move its welding apparatus 84 the predetermined distances along from the origin along the X, Y and Z axes and commence welding the tubes to the tubesheet. The actual weld locations should coincide with the preset theoretical weld locations. The method of the present invention should allow for the production of a plurality of welded coils and tubesheets in a series, that is, one after another in succession, with the actual origin and spatial orientation of each tubesheet being determined and correlated with the theoretical origin. The results should be exactly positioned welds, and these results should be consistent and repeatable.

It should be understood that the order of steps set forth above for sensing the position and orientation of the tubesheet is given for purposes of illustration only. The order of steps may be modified.

These steps may be incorporated into the available software, such as the "Smartac" and "Arcware" software described above.

Once all of the welding of the tube ends to the tubesheets is completed, then the inlet and outlet headers 22, 24 may be completed by welding the inlet and outlet covers 30, 32 to the tubesheets 40. In FIG. 11, one cover 30 is shown, and it should be understood that the following description of the cover and of the steps in welding the cover to the underlying tubesheet 40 apply to the other cover as well. As shown in FIG. 11, the header cover 30 has a short top face 100 and a short bottom face 102 that are parallel to each other and perpendicular to the planar face 60 of the tubesheet 40. The cover 30 also has top and bottom edges 104, 106, and elongate side faces 108, 110 that are parallel to each other and perpendicular to and extend between the planar face 60 of the tubesheet 40 and to the top and bottom faces 100, 102 of the cover. An upper cover face 112 extends between the first and second short faces 100, 102, as well, and is parallel to the planar face 60 of the tubesheet 40. Two angled connecting faces 114, 116 connect the top face 112 and the elongate side faces 108, 110. The elongate side faces 108, 110 have elongate side edges 118, 120 that are generally parallel to each other and perpendicular to the top face edge 104 and bottom face edge 106. Generally, the covers 30, 32 and tubesheets 40 are welded together in fluid-tight connections along the top and bottom edges 104, 106 and elongate side edges 118, 120. The present invention accomplishes this welding with robotic welding. As in the case of welding the tube ends and tubesheets together, accurate location of the tubesheets and covers, and relation of the located parts to a reference coordinate system are necessary for proper robotic welding.

In the present invention, the robotic welding equipment has stored the information as to the locations of the tubesheets, that is, it stores information related to the actual origin and actual orientation of the tubesheet and uses the same reference coordinate system for the planar face 60 of the tubesheets 40 for welding the covers as for the welding of the tube ends and tubesheets. This is advantageous since it is preferable to position the covers with reference to the interior holes 44 rather than with the exterior edges 52, 54, 56, 58 of the tubesheets 40 since the edges apart from the notches or cutouts may not be straight or perpendicular, and it is necessary that the holes 44 be completely covered by the covers 30, 32.

The header cover 30 is placed on the tubesheet 40 so that all the holes 44 where the coil tubes ends are welded to the tubesheet are covered by the cover 30 and the edges 104, 106, 118, 120 of the cover 30 are juxtaposed with the planar face 60 of the tubesheet 40. The edges of the header cover 30 may not be exactly parallel to the tubesheet edges. Next, six searches are performed to determine the header orientation. The six searches are as follows.

First, the controlling means 86 directs the robot scanner or sensor 82 to search or scan one elongate face 108 of the cover 30 near one of the short faces 100, 102, such as the top short face 100, to determine a first upper elongate face location, designated "P5" in FIG. 11. The location is determined with respect to the actual origin 96 of the tubesheet 40 and actual orientation of the tubesheet. Information on this first or upper elongate face location P5 is stored in the memory of the robotic control means 86.

Next, the same elongate face 108 is searched or scanned near the opposite bottom short face 102 of the cover 30 to determine a first bottom elongate face location, designated "P6" in FIG. 11. The location is determined with respect to the actual origin 96 of the tubesheet 40 and actual orientation of the tubesheet. Information on this second or bottom elongate face location P6 is stored in the memory of the robotic control means 86.

Next, one short face 100, 102 of the cover 30 is searched by moving the robotic scanner or sensor 82 to determine a first short face location, designated "P7" in FIG. 11 for the top face 100 of the cover 40, although the location may be for the top or bottom short face 100, 102. The location may be determined with respect to the actual origin 96 of the tubesheet and the actual orientation of the tubesheet. Information on this first short face location P7 may be stored in the robotic control means 86 memory.

Next, the second elongate face 110 of the cover 30 near one side edge 120 is searched, nearer to one of the short faces, such as the top short face 100 to determine a first upper elongate location designated "P8" in FIG. 11. The first upper elongate location P8 is determined with respect to the actual origin 96 of the tubesheet 40 and the actual orientation of the tubesheet 40, and this first upper elongate face location P8 is stored in the memory of the robot control means 86.

Next, the robot 80 moves its scanner 82 to continue to scan or search the second elongate face 110 of the cover 40 nearer the bottom short face 102 to determine a first lower elongate face location designated "P9" in FIG. 11. The lower elongate face location P9 is determined with respect to the actual origin 96 of the tubesheet 40 and the actual orientation of the tubesheet and stored in the memory of the robotic control means 86.

Finally, the robot 80 moves its scanner 82 to search the second or bottom short face 102 of the cover 30 to determine a second short face location designated "P10" in FIG. 11. The second short face location P10 is determined with respect to the actual origin 96 of the tubesheet 40 and the actual orientation of the tubesheet, and information as to the location P10 of the second short face 102 is stored in the memory of the robot control means 86.

With this information, the program of the control means 86 should be able to interpolate or determine the positions of the four intersections or corners 130, 132, 134, 136 of the side edges 118, 120, top edge 104 and bottom edge 106 so the four seams can be welded at the junctions of the cover edges 104, 106, 118, 120 and the face 60 of the tubesheet 40. The robotic control system 86 can determine the positions of these corners 130, 132, 134, 136 relative to the actual origin 96 and actual orientation of the tubesheet from the stored information. The robotic control means 86 can then move the welding apparatus 84 to positions based on the actual locations of the corners and weld each edge 104, 106, 118, 120 to the face 60 of the tubesheet 40.

The order of searches may be changed from that described above, and welding of some edges may be done before all the searches are completed. For example, it may be desirable to first search one of the short faces, such as short face 100 of the cover 30 before searching one of the elongate faces, for example, 108. And it may be desirable to weld a seam such as that between the short face 100 and the tubesheet 40 before finishing the other searches.

As an example of one alternate search and weld routine for welding the cover 30 to the tubesheet 40, the point designated P6 in FIG. 11 could first be located, followed by a search of the bottom short face 102 to find the point designated P10 and to define the intersection designated 134 in FIG. 11. Next, the point designated P5 in FIG. 11 may be located, and the welding apparatus 84 may be moved to weld the cover to the tubesheet face 60 along the elongate side edge 118. Next, the robotic system sensor 82 may be moved to search the elongate face 110 to locate the point designated P9 in FIG. 11. After searching the bottom plate or face 102, the position of the intersection designated 136 in FIG. 11 may be determined, and the bottom short face 102 may be welded to the tubesheet face 60 along the bottom edge 106. Next, the top part of the right elongate face 110 may be searched to find the point designated P8 in FIG. 11, followed by a search of the top short face 100 to find the point designated P7 in FIG. 11. The intersections designated 130 and 132 in FIG. 11 may thus be located and the cover 30 may be welded to the face 60 of the tubesheet along the top edge 104 and right side edge 120 of the cover 30. It may also be desirable to perform additional searches, such as at points midway along the elongate faces 108, 110.

The software used for the robotic control means should be able to accurately find the joints for welding using a limited number of searches and recalling the tubesheet plane defined during tubesheet and tube end welding. As illustrated, the locations of the seams may be found independent of the depth of the header, and for headers of different lengths and widths. Notably, given the lengths of the long sides 108, 110 of the header covers, two searches are preferably conducted to ensure that the actual header cover orientation is found and to account for variances in the cover; given the short lengths of the top and bottom faces 100, 102, one search should suffice for these faces since even a variance of 0.5 inches over a 40 inch length would only amount to a difference of 0.0625 inches over the 5 inch length of the top and bottom faces.

The illustrated tubesheet 40 has notches or cutouts 75 on both the top edge 52 and bottom edge 54 even though only one of these two cutouts 75 is used in the searching routine.

By providing both cutouts 75, the same tubesheet could be used for either the inlet or the outlet header simply by flipping the tubesheet around. Thus, instead of requiring different tubesheets, one style of tubesheet may be used interchangeably on both ends of the coil.

It may be preferred to control the positions of the ends 18, 20 of the tubes 14 in relation to the faces 60 of the tubesheets 40, 41. Preferably, the ends 18, 20 of the tubes 14 extend a distance of about one-half inch from the faces 60 of the tubesheets 40, 41, or within a range of about three-eights to about five-eighths inches from the faces 60 of the tubesheets 40, 41 before scanning and welding are commenced.

While only specific embodiments of the invention have been described and shown, those in the art should recognize that various modifications can be made thereto and alternatives used. In addition, it should be recognized that the present invention has applications beyond the illustrated environment. It is, therefore, the intention in the appended claims to cover all such modifications and alternatives and applications as may fall within the true scope of the invention.

We claim:

1. A method of making a heat exchanger having tubes with inlet and outlet headers welded to the tubes, the method comprising the steps of:

providing a planar tubesheet to form part of the inlet header;

providing a planar tubesheet to form part of the outlet header;

each tubesheet having a perimeter, a first edge portion, a second edge portion and a third edge portion along the perimeter of the tubesheet, the first and second edge portions being substantially co-linear, the third edge portion intersecting a line through the first and second edge portions;

each tubesheet having a substantially planar surface with interior edges defining interior holes to receive the ends of the tubes;

providing a robotic welding system including a sensor, a welding apparatus and means for controlling the movement and operation of the welding apparatus, the control means accepting input from the sensor;

defining a reference origin along a line through the first and second edge portions of the tubesheet and a line through the third edge portion and perpendicular to the line through the first and second co-linear edge portions;

providing a reference three-dimensional coordinate system having the reference origin, the reference three-dimensional coordinate system including reference weld locations for the tubesheet based on distances from the reference origin, so that movement of the welding apparatus may be based upon the reference weld locations and reference three-dimensional coordinate system;

scanning one of the tubesheets with the robotic system sensor a sufficient number of times to define an actual origin lying along a line through the first and second edge portions and a line through the third edge portion and perpendicular to the line through the first and second co-linear edge portions;

the robotic system correlating the actual origin and the reference origin; and moving the welding apparatus of the robotic system to weld the tubesheet and the tubes together, the positions of the welds being based upon the location of the actual origin.

2. The method of claim 1 wherein the tubesheet has a plurality of edges around its perimeter and wherein the first and second co-linear edge portions comprise cutouts along one edge and the third edge portion comprises a cutout along a different shorter edge.

3. The method of claim 1 wherein the first second and third edge portions comprise notches along the perimeter of the tubesheet, the method further comprising the step of forming the notches and the interior holes at the same time.

4. The method of claim 1 wherein the method is used to produce a plurality of welded tubesheets and tubes in a series and wherein the robotic system locates the actual origin of each tubesheet and correlates the reference origin to the actual origin for each tubesheet.

5. The method of claim 1 wherein the actual origin is determined independently of the position and orientation of any fixture supporting the tubesheet or tubes.

6. The method of claim 1 wherein the method further comprises the steps of:

storing information related to the actual origin of the tubesheet;

providing a cover for each tubesheet, each cover having a first short face, a second short face, two first and second elongate faces extending between the first short and second short faces, an upper cover face extending between the first short and second short faces, the first short, second short and first and second elongate faces having intersecting edges to be welded to the tubesheet;

placing one cover on one tubesheet so that the welds between the tubesheet and the tubes are all covered by the cover and the edges of the cover are juxtaposed with the planar surface of the tubesheet;

scanning one elongate face of the cover at one position nearer the first short face than the second short face to determine a first upper elongate face location, the location being determined with respect to the actual origin of the tubesheet;

storing information related to the first upper elongate face location;

scanning the elongate face of the cover at a position nearer the second short face than the first short face to determine a first lower elongate face location, the location being determined with respect to the actual origin of the tubesheet;

storing information related to the first lower elongate face location;

scanning one short face of the cover to determine a first short face location, the location being determined with respect to the actual origin of the tubesheet;

storing information related to the first short face location;

scanning the other elongate face of the cover at one position nearer the first short face than the second short face to determine a second upper elongate face location, the location being determined with respect to the actual origin of the tubesheet;

storing information related to the second upper elongate face location;

scanning the other elongate face of the cover at a position nearer the second short face than the first short face to determine a second lower elongate face location, the location being determined with respect to the actual origin of the tubesheet;

storing information related to the second lower elongate face location;

scanning the second short face of the cover to determine a second short face location, the location being determined with respect to the actual origin of the tubesheet;

storing information related to the second short face location;

determining the positions of the intersections of the edges of the cover relative to the actual origin of the tubesheet;

moving the welding apparatus to positions based on the positions of the intersections of the edges of the cover and welding the cover to the tubesheet along each edge.

7. The method of claim 6 wherein the cover is welded to the tubesheet along at least one edge before all of the scans are performed.

8. The method of claim 1 wherein the planar surface of the tubesheet is disposed in a substantially vertical plane before the tubesheet is scanned.

* * * * *